United States Patent
Regnath et al.

Patent Number: 5,711,644
Date of Patent: Jan. 27, 1998

[54] SCREW RETENTION DEVICE

[75] Inventors: Günter Regnath, Küssaberg; Herbert Senn, Jestetten, both of Germany

[73] Assignee: Asea Brown Boveri AG, Baden, Switzerland

[21] Appl. No.: 707,605

[22] Filed: Sep. 5, 1996

[30] Foreign Application Priority Data

Nov. 2, 1995 [DE] Germany ............ 195 40 743.1

[51] Int. Cl.⁶ .............. F16B 39/10; F16B 39/24
[52] U.S. Cl. ................ 411/131; 411/119; 411/130
[58] Field of Search ............... 411/119, 130, 411/131, 132, 136, 148, 149

[56] References Cited

U.S. PATENT DOCUMENTS

| | | | |
|---|---|---|---|
| 347,147 | 8/1886 | Anderson | 411/131 |
| 2,537,527 | 1/1951 | Heckert | 411/119 X |
| 3,351,116 | 11/1967 | Madsen | 411/131 X |

FOREIGN PATENT DOCUMENTS

| 174836 | 2/1922 | United Kingdom | 411/130 |
|---|---|---|---|

*Primary Examiner*—Neill R. Wilson
*Attorney, Agent, or Firm*—Burns, Doane, Swecker & Mathis, L.L.P.

[57] ABSTRACT

In a screw retention device for a screw (1) by means of which a first component (2a) and a second component (2b) are braced, a plain washer (5b) bears positively on the first component (2a) and is likewise braced by means of the head of the screw (1) on this first component (2a). A retaining washer (5a) is connected positively to the head of the screw (1), and the retaining washer (5a) is connected to the plain washer (5b) by means of a welding bead (4).

12 Claims, 1 Drawing Sheet

SCREW RETENTION DEVICE

BACKGROUND OF THE INVENTION

1. Field of the Invention

The invention relates to a screw retention device as described in the preamble of the claim.

1. Discussion of Background

When a screw is tightened firmly, the thread flights come to bear on one side. Since screws are self-locking, the friction occurring on the thread bearing face prevents them from coming loose. If the prestress becomes equal to zero as a result of slip, the bearing pressure in the thread ceases, and the screw may come loose. In the event of jolts and vibrations, this limit may be reached. Retaining elements are used for this situation in screw connections, said retaining elements increasing the limiting displacement point, occurring when the bending resistances of the screw are exceeded (slip), to such an extent that said point is no longer exceeded under practical conditions.

Unscrewing safeguards prevent any independent loosening and preserve over 80% of the prestressing force. Various unscrewing safeguards are employed according to the different requirements at the place of use. These requirements embrace both dynamic and thermal loads and the resulting conditions for the choice of material of the components to be braced and of the screw connection.

Thus, for example, ratchet screws and ratchet nuts can be employed only where highly prestressed screw connections are subjected to a load predominantly perpendicular to the screw axis and where there are no hardened surfaces of the components to be braced.

In contrast, microencapsulated adhesive can be used even for hardened surfaces. Here, however, the temperature limit of the adhesive used restricts the range of use and it is necessary to ensure that the bonding faces are grease-free during assembly.

Furthermore, positive washers, also braced and having tabs or outer noses, are employed as unscrewing safeguards. Their range of use is limited to lower strength classes of screws.

Unreleasable unscrewing safeguards in the form of welding spots or welding beads are also employed. In this case, the heads of the prestressed screws are welded directly to the braced component. A precondition for employing this safeguard is the weldability of the screw materials and component materials used. Usually, only alloys which are not high-strength can be welded under room conditions. In contrast, high-strength alloys can generally be welded only inadequately in light of cost-intensive and time-intensive outlay for special welding conditions and preheating and cooling operations. This outlay is necessary particularly when, on account of the dynamic and thermal operating states, both the components to be braced and the screw connection consist of high-strength, inadequately weldable material.

The retention of weldable screws on inadequately weldable components, if the operating states allow the use of such screws, is simpler in comparison. In this case, a weldable washer positively connected to the component is also braced and is subsequently welded together with the screw head.

SUMMARY OF THE INVENTION

Accordingly, one object of the invention is to provide a novel screw retention device of the initially mentioned type by means of which inadequately weldable or nonweldable screws and basic materials can be retained unreleasably in a simple and economic way.

This object is achieved according to the invention by means of the features of the claim.

The advantages of the invention are to be seen, inter alia, in that a removal of the screw retention device is possible, neither the screw connection nor the braced components being damaged. This advantage is important particularly when high-strength and therefore comparatively expensive alloys are used.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, which represents diagrammatically an exemplary embodiment of the invention and wherein.

Only the elements essential for understanding the invention are shown.

DESCRIPTION OF THE PREFERRED EMBODIMENT

Figure 1:
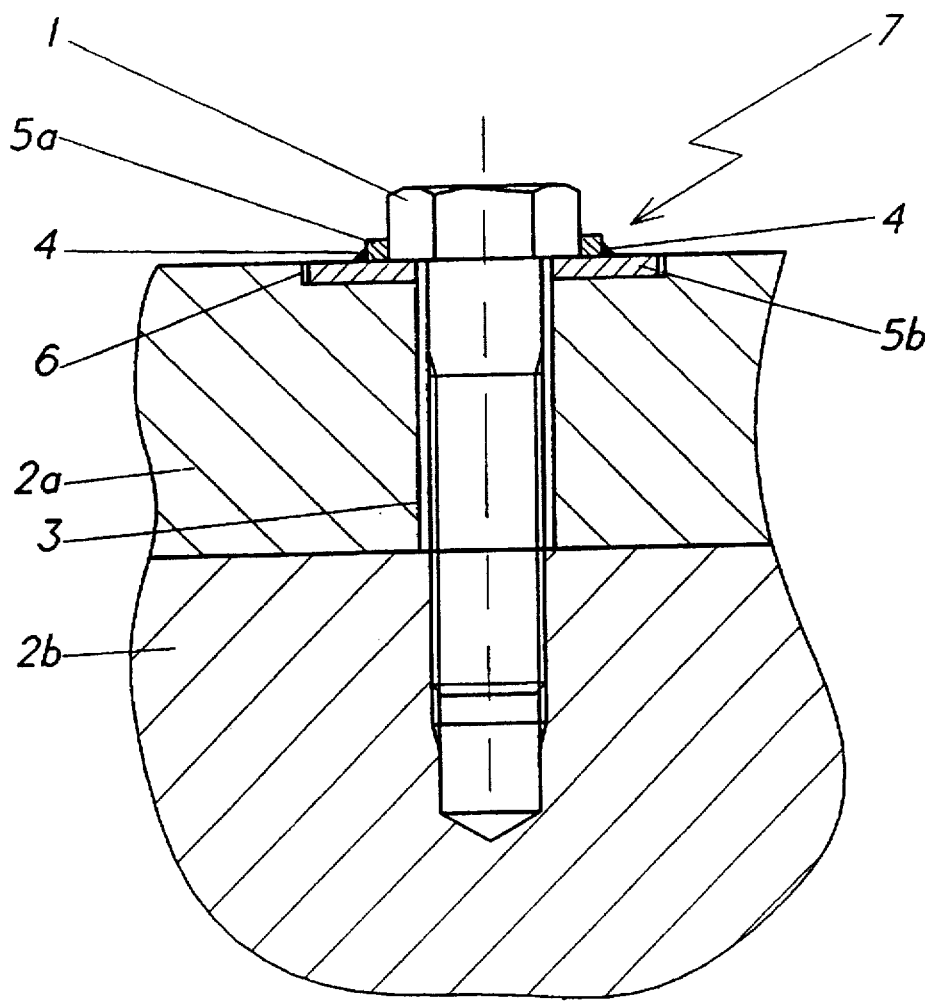
FIG. 1 shows a longitudinal section through a screw connection with an unreleasable screw retention device.
Figure 2:
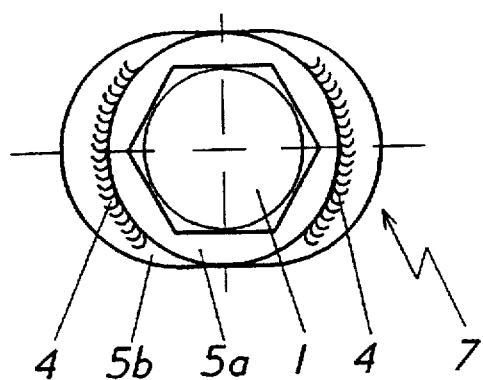
FIG. 2 shows a top view of the screw retention device.

Referring now to the drawing, wherein like reference numerals designate identical or corresponding parts throughout the views, in FIG. 1, 1 designates a screw with an outer hexagon, said screw bracing a first component 2a together with a second component 2b and being retained unreleasably by means of a screw retention device 7. The screw 1 is guided in a bore 3 of the first component and is screwed to the second component 2b. An oval washer 5b is inserted in a groove 6 between the head of the screw 1 and the first component 2a and is also braced. FIG. 2 illustrates this arrangement in a top view of the screw head. This screw head with outer hexagon, after being braced, is surrounded by a retaining ring 5a which has an inner hexagon. The two essential constituents 5a, 5b of the screw retention device 7 consist of a material which is easily weldable under room conditions. They are welded together with one another unreleasably by means of welding beads 4 and thus retain the screw 1 against any loosening.

The screw retention device 7 thus provided constitutes a combination of the positive and unreleasable types of retention. The oval washer 5b is arranged positively on the first component 2a, the retaining ring 5a is likewise positively connected to the screw 1, and the oval washer 5b and the retaining ring 5a are welded together unreleasably.

This type of screw retention device 7 is used wherever the operating conditions which occur necessitate a special choice of material for the components 2a, 2b to be braced and for the screw 1. Thus, for example, high temperatures and mechanical vibrations together with torsional and shearing load, along with simultaneously occurring fluctuations in the state variables, make it necessary, in a screw connection, to use high-strength metal alloys both for the components 2a, 2b to be braced and for the screw 1. As a rule, these high-strength metal alloys can be welded under atmospheric conditions only at a high and comparatively expensive outlay. Metal alloys which can be welded simply and therefore inexpensively under room conditions are used for the screw retention device 7 according to the invention.

Thus, by virtue of the above-described combination of various metal alloys, the required high strength of the components 2a, 2b and of the screw 1 is associated with the highly regarded properties of an unreleasable screw retention device 7, cost-effectiveness being taken into account in the process.

A further advantage is that, when the screw retention device 7 is opened at the welding bead 4, neither a component 2a, 2b nor the screw is damaged.

Of course, the invention is not restricted to the exemplary embodiment shown and described. Thus, the unreleasable screw retention device 7 can also be used, for example, on all components 2a, 2b to be braced and screws 1 which are made from nonweldable materials. It is likewise conceivable within the scope of the invention to have a screw head with an inner hexagon and a corresponding retention device 5a which is positively connected to the screw head and which is welded to the washer 5b arranged positively on the housing.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A screw retention device for a screw by means of which a first component and a second component of a high-strength metal alloy are braced,
    a plain washer engages positively on the first component and is braced by means of the head of the screw on this first component,
    a retaining washer engages positively on the head of the screw, and
    wherein the retaining washer is connected to the plain washer by means of a welding bead.

2. A screw retention device for a screw used for securing together a first component and a second component, said screw retention device comprising:
    a plain washer positively engaging on the first component and being braced by means of a head of the screw on the first component; and
    a retaining washer positively engaging on the head of the screw;
    wherein the retaining washer is connected to the plain washer by means of a welding bead.

3. The screw retention device of claim 2 wherein said plain washer includes a lower surface, an upper surface, and side surfaces extending therebetween, said side surfaces of said plain washer positively engaging the first component.

4. The screw retention device of claim 3 wherein said plain washer is positively seated in a correspondingly shaped groove in the first component such that said side surfaces of said plain washer positively engage the groove in the first component and rotation thereof is prevented.

5. The screw retention device of claim 4 wherein said plain washer and said groove have an oval shape.

6. The screw retention device of claim 2 wherein said retaining washer includes an engaging opening, said engaging opening approximately corresponding in size and shape to a head of the screw such that rotation thereof is prevented.

7. The screw retention device of claim 6 wherein said engaging opening is hexagonal.

8. A screw retaining system adapted for use with screws and components manufactured from a material having a first weldability characteristic, said retaining system comprising:
    a washer for positively engaging a component;
    a retaining ring for positively engaging a screw;
    wherein said washer and said retaining ring are manufactured from a material having a second weldability characteristic, said second weldability characteristic being greater than the first weldability characteristic, whereby materials having said second weldability characteristic are more weldable than materials having the first weldability characteristic;
    wherein said washer is welded to said retaining ring to thereby retain the screw within the component without direct welding thereof.

9. The screw retaining system of claim 8 wherein said washer is positively seated in a correspondingly shaped groove such that rotation thereof is prevented.

10. The screw retaining system of claim 9 wherein said washer has an oval shape.

11. The screw retaining system of claim 8 wherein said retaining ring includes an engaging opening, said engaging opening approximately corresponding in size and shape to a head of screws such that rotation thereof is prevented.

12. The screw retaining system of claim 11 wherein said engaging opening is hexagonal.

* * * * *